(12) United States Patent
Svorcan

(10) Patent No.: US 9,127,427 B1
(45) Date of Patent: Sep. 8, 2015

(54) RECOVERING MATURE FINE TAILINGS FROM OIL SANDS TAILINGS PONDS

(71) Applicant: Technika Engineering Ltd., Calgary (CA)

(72) Inventor: Rade Svorcan, Calgary (CA)

(73) Assignee: Technika Engineering Ltd., Alberta (CA)

(*) Notice: Subject to any disclaimer, the term of this patent is extended or adjusted under 35 U.S.C. 154(b) by 0 days.

(21) Appl. No.: 14/727,689

(22) Filed: Jun. 1, 2015

Related U.S. Application Data

(60) Provisional application No. 62/113,906, filed on Feb. 9, 2015.

(51) Int. Cl.
| | |
|---|---|
| B01D 21/24 | (2006.01) |
| C10G 1/04 | (2006.01) |
| E02F 3/88 | (2006.01) |
| E02F 7/00 | (2006.01) |
| E02B 15/08 | (2006.01) |
| B01D 21/00 | (2006.01) |

(Continued)

(52) U.S. Cl.
CPC ............ E02B 15/08 (2013.01); B01D 21/0018 (2013.01); B01D 21/245 (2013.01); B03B 9/02 (2013.01); C10G 1/045 (2013.01); C10G 1/047 (2013.01); E02F 3/8833 (2013.01); E02F 7/065 (2013.01); *C02F 2103/10* (2013.01)

(58) Field of Classification Search
CPC ............ E02F 3/88; E02F 3/8833; E02F 5/28; E02F 7/005; E02F 7/065; B01D 21/0018; B01D 21/245; B01D 2221/04; B03B 9/02; C02F 2103/10; C10G 1/045; C10G 1/047

USPC .................. 210/747.9, 803, 170.01, 170.04, 210/170.05, 242.1, 523; 37/307, 314; 208/390, 391
See application file for complete search history.

(56) References Cited

U.S. PATENT DOCUMENTS

| 4,073,080 A | * | 2/1978 | Willums et al. ................. 37/314 |
| 4,399,039 A | | 8/1983 | Yong |

(Continued)

FOREIGN PATENT DOCUMENTS

| CA | 2 581 607 A1 | 9/2008 |
| CA | 2 812 202 A1 | 2/2014 |

*Primary Examiner* — Christopher Upton
(74) *Attorney, Agent, or Firm* — Seed IP Law Group PLLC

(57) ABSTRACT

The present disclosure relates to systems and methods for recovering mature fine tailings (MFT) from oil sands tailings ponds. Some examples include a hollow, fully enclosed around its perimeter, ideally of cylindrical form, open bottom structure (a hollow conduit), of predetermined geometry, which is placed at the pond surface. The hollow conduit can penetrate MFT deposits to or below a level at which MFT of required density is located. A width or diameter of the hollow conduit can be determined with respect to the MFT inflow velocity and the corresponding shear rate, so as to enable MFT flow into the hollow conduit at a rate matching a rate at which the MFT is removed from the pond (e.g., a recovery rate). An MFT fill level inside the hollow conduit can be kept constant and equal to a required fill level throughout MFT recovery operations. MFT can enter the hollow conduit during MFT recovery operations solely under action of hydraulic head pressure. MFT can be transferred from within the hollow conduit utilizing a mechanical device such as a pump or a siphon, for transfer to shore based facilities and further processing.

19 Claims, 7 Drawing Sheets

(51) Int. Cl.
    *B03B 9/02*     (2006.01)
    *E02F 7/06*     (2006.01)
    *C02F 103/10*     (2006.01)

(56) References Cited

U.S. PATENT DOCUMENTS

| | | | |
|---|---|---|---|
| 4,437,998 A * | 3/1984 | Yong | 210/803 |
| 4,449,850 A * | 5/1984 | Cessou et al. | 405/60 |
| 8,137,566 B2 * | 3/2012 | Bozak et al. | 208/391 |
| 8,597,515 B2 * | 12/2013 | Musale et al. | 210/747.9 |
| 2002/0133983 A1 * | 9/2002 | Chesner et al. | 37/307 |
| 2012/0160781 A1 * | 6/2012 | D'Hollander | 210/513 |
| 2012/0248042 A1 * | 10/2012 | Baldrey et al. | 210/170.01 |
| 2013/0081298 A1 * | 4/2013 | Bugg et al. | 34/389 |
| 2013/0175223 A1 * | 7/2013 | Rennard et al. | 210/170.05 |

\* cited by examiner

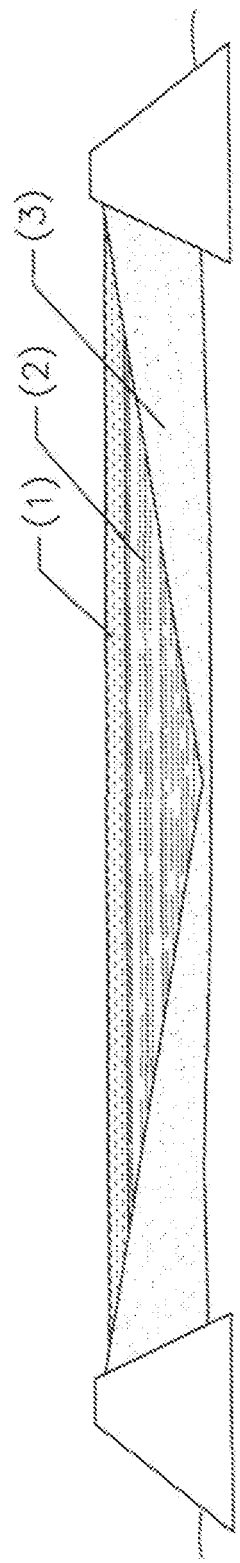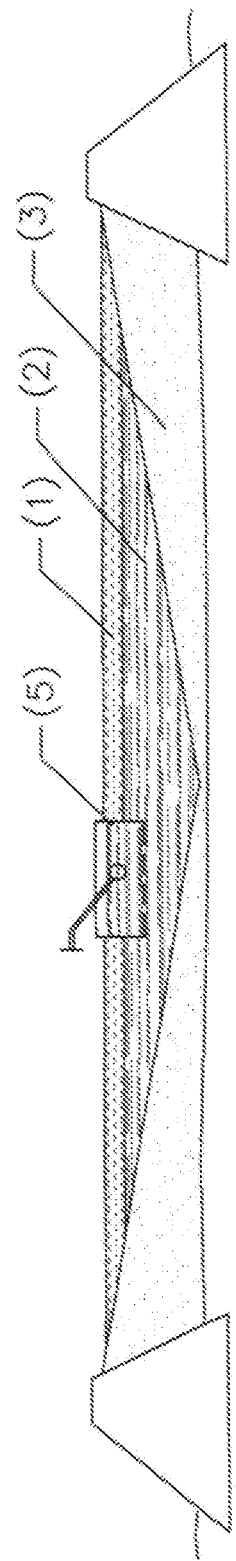

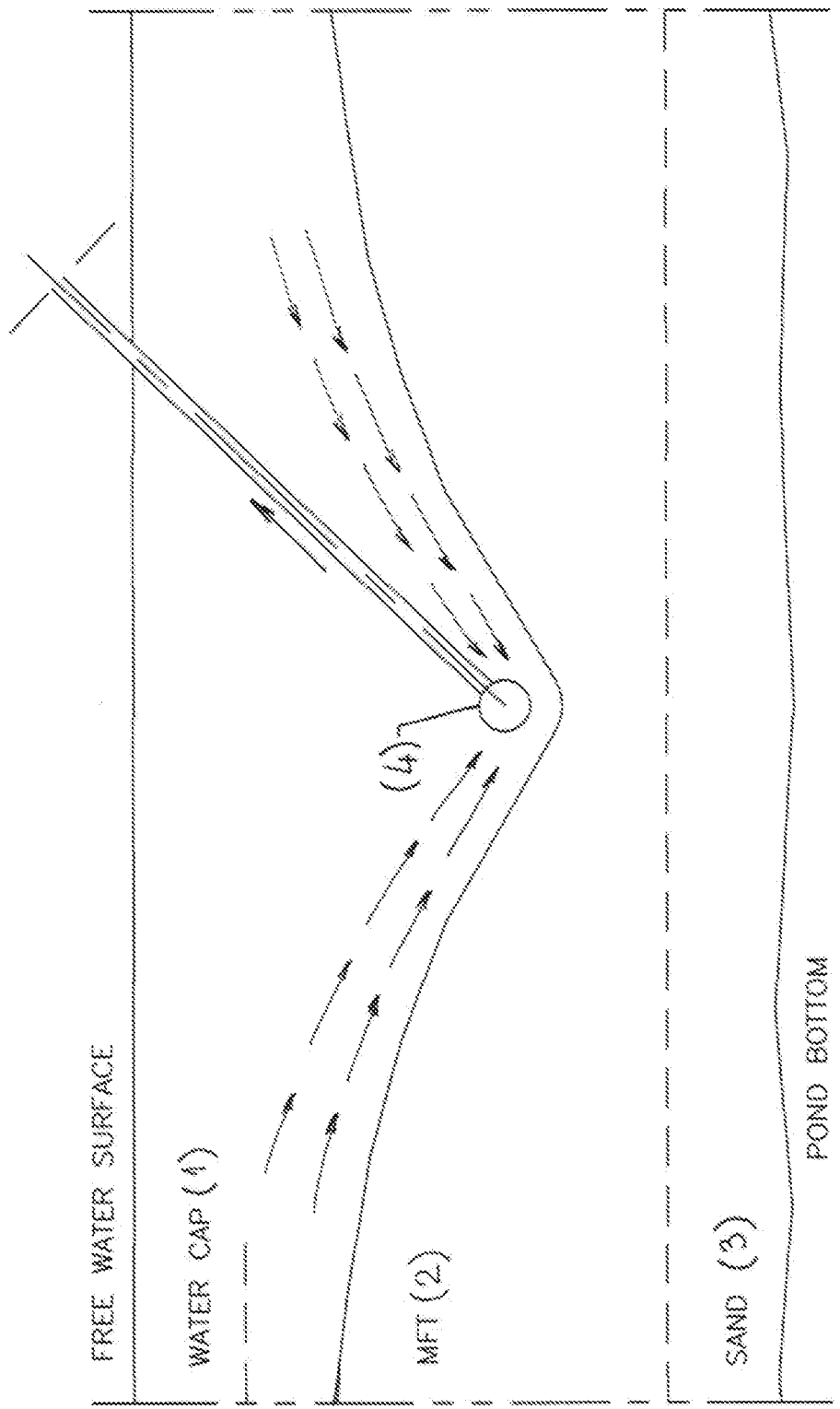

RECOVERING MATURE FINE TAILINGS FROM OIL SANDS TAILINGS PONDS

BACKGROUND

1. Technical Field

The present disclosure is related to systems for recovering mature fine tailings (MFT) from oil sands tailings ponds, as well as methods of designing, making, and using such systems.

2. Description of the Related Art

Oil sands tailings ponds are containments used to store wastes and byproducts of bitumen extraction from oil sands. They can be used to store residual bitumen, fine silts, sand, suspended solids, etc., often suspended in water in the tailings ponds. Managing such tailings ponds and the materials stored therein is a complex and important environmental challenge.

Some systems have been developed to transfer tailings from tailings ponds, such as for further processing, but these prior systems suffer from various drawbacks. There is room for improvement in the management of oil sands tailings ponds and the processing of tailings stored therein.

BRIEF SUMMARY

In some embodiments, a method comprises selecting a desired density of mature fine tailings to be removed from an oil sands tailings pond, positioning a hollow conduit within the oil sands tailings pond such that a bottom end of the hollow conduit is open to the mature fine tailings of the desired density and such that a top end of the hollow conduit is open above a free water surface of the pond, and removing the mature fine tailings of the desired density from within the hollow conduit.

In some cases, the method can include adjusting a length of the hollow conduit. In some cases, the method can include coupling deflector plates to an outer surface of the hollow conduit. In some cases, the method can include coupling a buoyancy element to the hollow conduit. In some cases, selecting a desired density comprises selecting a desired density greater than 1.35 t/m³. In some cases, the hollow conduit is a hollow cylindrical conduit. In some cases, removing the mature fine tailings of the desired density from within the hollow conduit comprises pumping the mature fine tailings of the desired density from within the hollow conduit. In some cases, removing the mature fine tailings of the desired density from within the hollow conduit comprises siphoning the mature fine tailings of the desired density from within the hollow conduit.

In some embodiments, a method includes selecting a desired density of mature fine tailings to be removed from an oil sands tailings pond, selecting a desired recovery rate of the mature fine tailings of the desired density, selecting a fill level height of the mature fine tailings of the desired density to be maintained within a hollow conduit, determining a plastic viscosity of the mature fine tailings of the desired density, determining a shear strength at rest of the mature fine tailings of the desired density, determining a diameter of the hollow conduit so as to satisfy the condition that when the hollow conduit is positioned within the oil sands tailings pond such that a bottom end of the hollow conduit is open to the mature fine tailings of the desired density and such that a top end of the hollow conduit is open above a free water surface of the pond, and when the mature fine tailings of the desired density are being removed from within the hollow conduit: a net hydraulic head pressure acting upon the mature fine tailings of the desired density at an outer side of the bottom end of the hollow conduit balances a sum of a net hydraulic head pressure acting over the selected fill level height upon the mature fine tailings of the desired density at an inner side of the bottom end of the hollow conduit, a dynamic pressure of the mature fine tailings of the desired density, and an operating shear resistance of the mature fine tailings of the desired density, and fabricating the hollow conduit having the determined diameter.

In some cases, the method can include positioning the hollow conduit within the oil sands tailings pond such that the bottom end of the hollow conduit is open to the mature fine tailings of the desired density and such that the top end of the hollow conduit is open above a free water surface of the pond. In some cases, the method can include removing the mature fine tailings of the desired density from within the hollow conduit. In some cases, the method can include adjusting a length of the hollow conduit. In some cases, the method can include coupling deflector plates to an outer surface of the hollow conduit. In some cases, the method can include coupling a buoyancy element to the hollow conduit.

In some cases, selecting a desired density comprises selecting a desired density greater than 1.35 t/m³. In some cases, the hollow conduit is a hollow cylindrical conduit. In some cases, removing the mature fine tailings of the desired density from within the hollow conduit comprises pumping the mature fine tailings of the desired density from within the hollow conduit. In some cases, removing the mature fine tailings of the desired density from within the hollow conduit comprises siphoning the mature fine tailings of the desired density from within the hollow conduit.

In some embodiments, a system includes an oil sands tailings pond including mature fine tailings, and a hollow conduit positioned within the pond such that a bottom end of the hollow conduit is open to the mature fine tailings, such that a top end of the hollow conduit is open above a free water surface of the pond, and such that the mature fine tailings fill the hollow conduit to a predetermined fill level height, the hollow conduit having a diameter such that when the mature fine tailings are being removed from within the hollow conduit, a net hydraulic head pressure acting upon the mature fine tailings at an outer side of the bottom end of the hollow conduit balances a sum of a net hydraulic head pressure acting over the predetermined fill level height upon the mature fine tailings at an inner side of the bottom end of the hollow conduit, a dynamic pressure of the mature fine tailings, and an operating shear resistance of the mature fine tailings.

BRIEF DESCRIPTION OF THE SEVERAL VIEWS OF THE DRAWINGS

FIG. 1 illustrates an example of an oil sands tailings pond.

FIG. 2 illustrates the oil sands tailings pond of FIG. 1 with one embodiment of an MFT transfer system situated therein.

FIG. 5 illustrates pumping MFT out of an oil sands tailings pond.

DETAILED DESCRIPTION

Mature fine tailings (MFT) are a byproduct of the bitumen extraction process of oil sands mining operations. The main components of MFT are water and oil sands fines, although numerous other ingredients are also found in MFT in smaller quantities. These other ingredients can either be originally found in the oil sands deposits, or can be introduced into MFT through the bitumen extraction process. The fines referred to herein can be solid particles smaller than nominally 44 microns, which do not settle to the bottom of the tailings ponds but stay in suspension for prolonged periods of time, thus creating MFT. Oil sands tailings, which are produced through the oil sands bitumen extraction process, are delivered to the tailings ponds via hydro transport installations.

Figure 3:
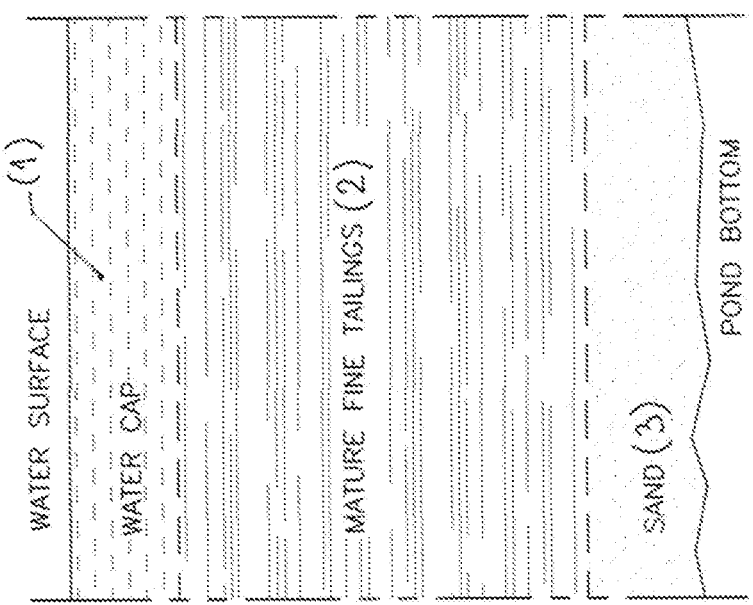
FIG. 3 illustrates an example of a vertical section through an oil sands tailings pond.

A typical configuration of an oil sands tailings pond is shown in FIG. 1. As shown therein, coarse tailings fractions such as sand settle to the bottom of the tailings pond or form what can be referred to as a beach. A portion of the water contained within the tailings creates a layer of recyclable water at the surface level of the tailings pond. This layer of recyclable water can be referred to as a water cap 1. The rest of the water combined with fines forms a layer of MFT 2 that is located between the water cap 1 on top and sand deposits 3 at the bottom of the pond. FIG. 2 illustrates the oil sands tailings pond of FIG. 1, provided with an MFT transfer system 5, as described in greater detail below. FIG. 3 illustrates an example of a vertical section taken through an oil sands tailings pond.

Figure 4:
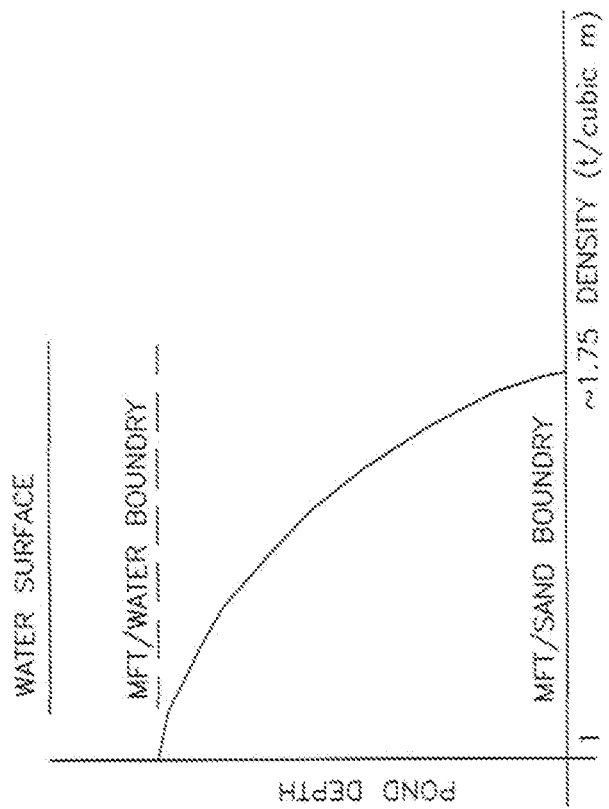
FIG. 4 illustrates an example of MFT density with depth in an oil sands tailings pond.

MFT can be a non-Newtonian, Bingham fluid. Its main rheological properties can be characterized by its density, its shear strength and its plastic viscosity. The least dense MFT can be found closer to the water cap, and the MFT's density, shear strength, and plastic viscosity can increase with depth. The MFT shear strength and plastic viscosity can each be a function of a percentage of fines in the MFT. FIG. 4 illustrates an example of MFT density with depth in an oil sands tailings pond. FIGS. 3 and 4 are aligned such that depths illustrated on the Y-axis in FIG. 3 align with corresponding depths illustrated on the Y-axis in FIG. 4.

MFT present a complex and important environmental challenge, and often it is desirable to remove MFT from the oil sands tailings ponds in which they are stored. For example, MFT may be removed from a tailings pond to meet environmental regulations aimed at reducing the volume of MFT accumulated through the bitumen extraction process, to reclaim the tailings ponds, to manage storage of tailings within the facilities, and/or to process the MFT to recover valuable materials therefrom.

Some systems have been developed to transfer MFT out of tailings ponds, such as stationary submersible pumping systems and dredging systems. Both of these types of systems utilize pumping device(s) placed at predetermined depths inside an MFT deposit. The MFT can then be recovered by pumping, and can be transported by hydro-transport installations to shore-based facilities for further processing.

Stationary submersible pumping systems can have various drawbacks. For example, MFT of density higher than 1.35 t/m$^3$ is not practically pumpable utilizing unaided stationary submersible pumping systems because the flow properties of MFT at the pumping depth prevent MFT from entering the pump at a sufficient rate to avoid pump overheating and cavitation. Further, the performance of submersible pumps can be greatly compromised by pump suction plugging due to accumulation of various debris around the pump suction. This debris is commonly found in MFT deposits. Pump plugging is a primary concern with utilizing this technology, regardless of the MFT density.

Further still, as shown in FIG. 5, unaided stationary pumping systems can create a pronounced cone formation of lighter fluid fractions around the pump suction point 4 due to the physical properties of MFT. This cone formation results in penetration of lower density MFT and water to the suction point 4, resulting in loss of the required density of MFT being pumped out of the tailings pond. The formation of the cone described herein can also be referred to as MFT coning, and is present with recovery of MFT of any density, although at lower MFT densities the cone becomes shallower and eventually flattens out at water level. That is, the cone can become more pronounced as the density of the MFT being pumped out of the pond increases (again, this can be due to the physical properties of the MFT being pumped, e.g., its density, sheer strength, and plastic viscosity).

Likewise, dredging systems can have various drawbacks. For example, they can also suffer from the effects of debris plugging and coning described above. In addition, dredging systems are often not practical for use in year-round operations, as the dredging systems are typically frequently relocated throughout the tailings pond, so that MFT is gathered from a large area of the oil sands tailings pond. This dredge system relocation makes it impractical to maintain MFT recovery operations year-round because the majority of many pond surfaces are covered with ice during winter months.

Figure 6:
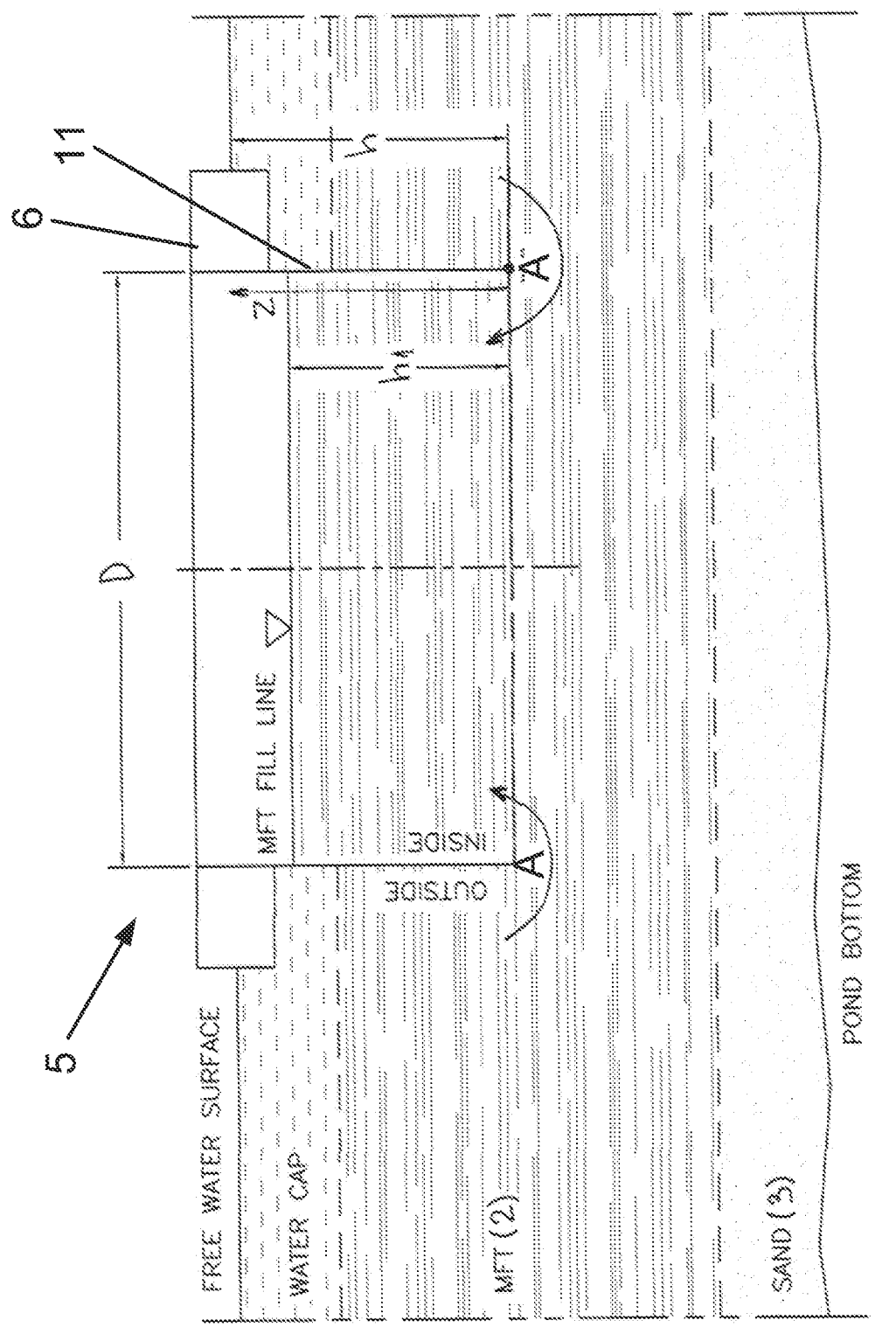
FIG. 6 illustrates an embodiment of an MFT transfer system situated within an oil sands tailings pond.

FIG. 6 illustrates one embodiment of an MFT transfer system 5 that can alleviate some of the above-described drawbacks of prior systems and can provide an effective and economical system for MFT recovery from oil sands tailings ponds. As shown in FIG. 6, the MFT transfer system 5 can include a hollow conduit 11, such as a hollow cylindrical conduit 11 that can be positioned such that its central longitudinal axis is vertical within an oil sands tailings pond. The hollow conduit 11 can be fully enclosed around its perimeter, having an open bottom of width or diameter D and an open top. The diameter D can be an inside diameter of the hollow conduit 11. In some cases, the diameter D can be between about 5 and 20 meters. The hollow conduit 11 can be made of steel, aluminum, fiber reinforced polymer, or various other composites or polymers.

The MFT transfer system 5 can also include a buoyancy device 6 coupled to a top end of the hollow conduit 11 such that the MFT transfer system 5 can be placed and float at the surface of an oil sands tailings pond. The buoyancy device 6 can be made of steel, aluminum, or other materials suitable for cold weather applications. When the MFT transfer system 5 is so placed in a tailings pond, a portion of the system 5 can be buoyed above the free water surface, and a portion of the system 5 can remain below the free water surface. An immersion height h of the system 5 can be defined as the distance from the free water surface to a bottom of the hollow conduit 11 when it is positioned in the tailings pond as shown in FIG. 6. In some cases, the height h can be between about 5 and 20 meters.

As noted above, the MFT density can increase with depth in the tailings pond. Thus, the height h can be selected so that the conduit 11 penetrates the MFT deposits to or below a depth at which MFT having a desired or required density is located. The dimensions D and h of the system 5 can be selected, based on rheological properties of the MFT, such that the system 5 can transfer MFT of desired density out of the tailings pond at a desired rate. For example, the selection of the dimension D can be based on the operating shear strength ($\tau_1$) and the dynamic pressure (q) of the MFT being removed from the pond.

Being a non-Newtonian fluid, MFT has shear strength at rest ($\tau_0$) which depends on the MFT density, maturity of MFT deposits, properties of oil sands ore and on the bitumen extraction process. In MFT recovery operations its reference expected value is nominally 50 Pa for density of 1.35 t/m$^3$. Operating shear strength ($\tau_1$) is the shear strength of MFT during the MFT recovery operations. MFT corresponds to the non-Newtonian, Bingham Plastic Model, except in the area of low shear rates as noted below and in FIG. 10. By the Bingham Plastic Model the operating shear strength is determined as: $\tau_1 = \tau_0 + \mu^* s$, where p is the plastic viscosity and s is the shear rate of the MFT. Operating shear strength results in an operating shear resistance, which can be considered a flow-resisting force.

Plastic viscosity ($\mu$) determines the gradient at which shear strength of MFT increases with the increase in shear rate. Its value also depends on MFT density, maturity of MFT deposits, properties of oil sands ore and the bitumen extraction process. In MFT recovery operations its reference expected value is nominally 40 mPa·s for density of 1.35 t/m$^3$.

Shear rate (s) is the characteristic of the MFT recovery system, and depends on the required recovery rate (Q) and the geometry of the MFT recovery system. The shear rate is a function of the velocity at which MFT enters the MFT recovery system.

Figure 10:
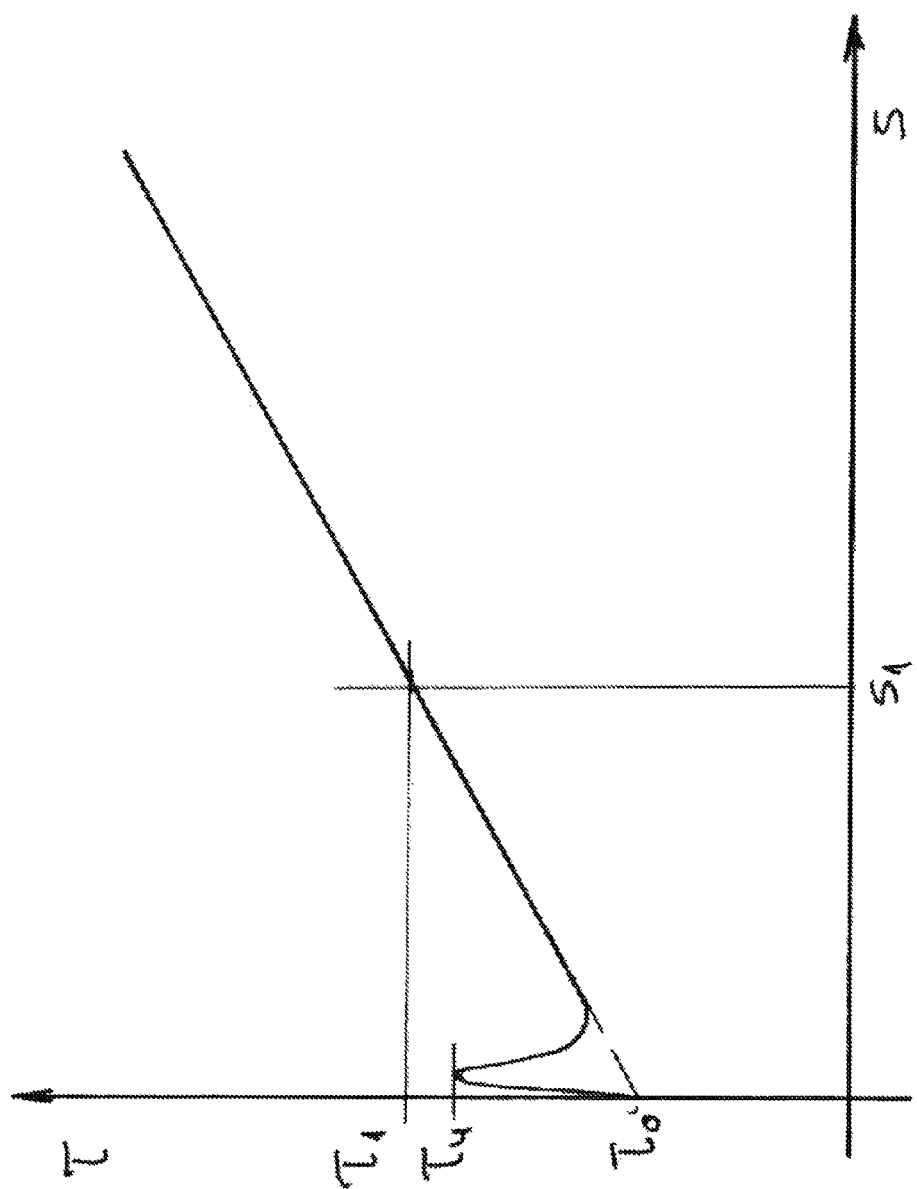
FIG. 10 illustrates a correlation between MFT shear strength and shear rate.

Another important parameter in MFT recovery systems is its upper yield strength ($\tau_u$). It characterizes a sudden increase in the MFT shear strength at shear rates dose to zero, and only in this area deviates from the Bingham Plastic Model. For a typical MFT recovery operation a reference value of the upper shear strength is 80 Pa for density of 1.35 t/m$^3$. FIG. 10 illustrates a relationship between shear strength ($\tau$, in Pascals) and shear rate (s, in s$^{-1}$). FIG. 10 illustrates a shear strength at rest ($\tau_0$), an upper yield strength ($\tau_u$), and an operating shear strength ($\tau_1$).

During MFT recovery operations, MFT has dynamic pressure (q) which is a function of the MFT density ($\rho$) and its velocity (v). It can be determined as $q = \frac{1}{2} * \rho * v^2$. The velocity (v) is, in turn, a function of the MFT required recovery rate (Q) and the geometry of the MFT recovery system. Dynamic pressure can be considered a flow-resisting force.

Thus, with this background in mind, suitable dimensions D and h can be determined. For example, a desired or required density ($\rho$) of MFT to be recovered can be selected. Based on the required density of MFT, a dimension h can be determined such that the bottom of the hollow conduit 11 is located at the same elevation as MFT of the required density. Further, a desired or required MFT recovery rate Q can be selected. MFT rheological properties, such as plastic viscosity ($\mu$) and shear strength at rest ($\tau_0$) can be determined, such as by sampling and testing the MFT, or by assuming they are equal to reference values such as the reference values provided above or other reference values for MFT of the required density, or by applying formulas that have been developed for the purpose of estimating MFT rheological properties. A required fill level $h_1$ of MFT to be maintained inside the hollow conduit 11 during the MFT recovery operations can be determined. For example, the dimension $h_1$ can be determined based on a minimum required submergence of an MFT collection device (e.g., a pump) to be placed inside the hollow conduit 11 and other requirements such as structural engineering requirements of the system 5.

With this information known, then, a minimum required value for the dimension D (e.g., $D_{min}$) can be determined. For example, $D_{min}$ can be determined based on the principle of conservation of energy. As one specific example, $D_{min}$ can be defined as the dimension for which the net hydraulic head pressure acting upon the MFT at the outer side of the bottom rim of the hollow conduit 11 equals or balances the sum of the net hydraulic head pressure acting upon the MFT at the inner side of the bottom rim of the hollow conduit 11 over the required fill level height $h_1$, and the flow-resisting forces of the dynamic pressure q of the MFT and the operating shear resistance of the MFT.

The above condition allows that for any given set of MFT recovery parameters (e.g., required density p and required recovery rate Q), a required dimension $D_{min}$ be determined such that continuous recovery of MFT is enabled while maintaining the required MFT fill level $h_1$. The dimension $D_{min}$ is important because it directly influences the MFT inflow velocity (v) and the corresponding shear rate (s), and thus the operating shear resistance and the dynamic pressure (q). $D_{min}$ can be determined analytically and/or by utilizing known computational fluid dynamics (CFD) procedures. In practice, the dimension D can be selected to be equal to or greater than a corresponding determined $D_{min}$. For example, D can be greater than $D_{min}$ to facilitate operations and maintenance aspects of the system 5.

If the dimension D is smaller than $D_{min}$, the MFT fill level within the hollow conduit 11 can be reduced and the required fill level $h_1$ may not be achieved. In theory, in some cases, e.g., for a certain critical value of the dimension D, the MFT fill level inside the hollow conduit 11 during recovery operations can decrease to zero, essentially leaving the hollow conduit 11 empty. On the other hand, if the dimension D is larger than $D_{min}$, the MFT fill level inside the hollow conduit 11 can be increased to a value higher than $h_1$. In theory, for a sufficiently large structure opening width or diameter D, the MFT dynamic pressure and operating shear resistance become negligible in value compared to the hydraulic head pressure, and the MFT fill level inside the hollow conduit 11 during the MFT recovery operations can approximate or be equal to a fill level inside the hollow conduit 11 corresponding to a hydrostatic balance of the fluids inside and outside of the hollow conduit 11. In general, however, the MFT fill level will always be lower than the free water surface, because the fluid inside the hollow conduit 11 has a higher density than the fluid outside the hollow conduit 11.

To use the system 5, the system 5 can be designed, built, and installed within an oil sands tailings pond. Water and low-density MFT can be removed from within the confines of the hollow conduit 11, while MFT of the required density enters the hollow conduit 11 under the action of hydraulic head pressure, as shown by arrows A in FIG. 6. The fill level maintained within the hollow conduit 11 during this transition process initially decreases and then stabilizes at a primed fill level, which can depend on the relative densities of the fluids inside and outside the hollow conduit 11, and which can reflect the hydrostatic balance level. This process can be referred to as priming. Once the priming process has been completed, transfer of the MFT from the pond can be initiated and a dynamic balance of fluids inside and outside the hollow conduit 11 can be achieved, resulting in the hollow conduit 11 being filled with MFT of the required density up to the required fill level $h_1$ during transfer of MFT from the pond. In general, the required fill level $h_1$ during transfer of MFT from the pond can be lower than the primed fill level, due to the effects of the dynamic pressure q of the MFT and the operating shear resistance of the MFT.

MFT can be transferred out of the pond through the hollow conduit 11 of the system 5, such as by a mechanical device such as a pump or a siphon. As MFT of the required density is transferred out of the hollow conduit 11 in this manner at the required rate, additional MFT of the required density can re-enter the hollow conduit 11 at the bottom end of the hollow conduit 11, also at the required rate. In this way, the system 5 can be used to allow a continuous recovery operation in which MFT of the required density can be brought to the surface level inside the hollow conduit 11 solely by the action of the hydraulic head pressure of the fluid(s) surrounding the system 5.

Thus, the problems associated with MFT coning are reduced or eliminated due to the fact that water and lower density MFT is not present within the confines of the structure. Coning around the hollow conduit 11 exists in theory but is small or negligible because the velocity of the MFT as it enters the hollow conduit 11 is relatively small. In some cases, a magnitude of this small or negligible coning effect can be calculated and/or mitigated, e.g., by increasing the immersion height h of the hollow conduit 11, such as by between about 0.1 and 0.3 meters. Further, the problems associated with debris found in MFT deposits are also reduced or eliminated because the debris is prevented from entering the hollow conduit 11 by its continuous all-round surrounding wall(s). Thus, the risk of plugging the MFT transfer device (e.g., pump or siphon) located inside the hollow conduit 11 is mitigated. Further still, an MFT transfer system 5 can allow continuous, year-round recovery of MFT from oil sands tailings ponds. An MFT transfer system 5 can allow continuous recovery of MFT having a density greater than 1.35 t/m$^3$.

Figure 7A:
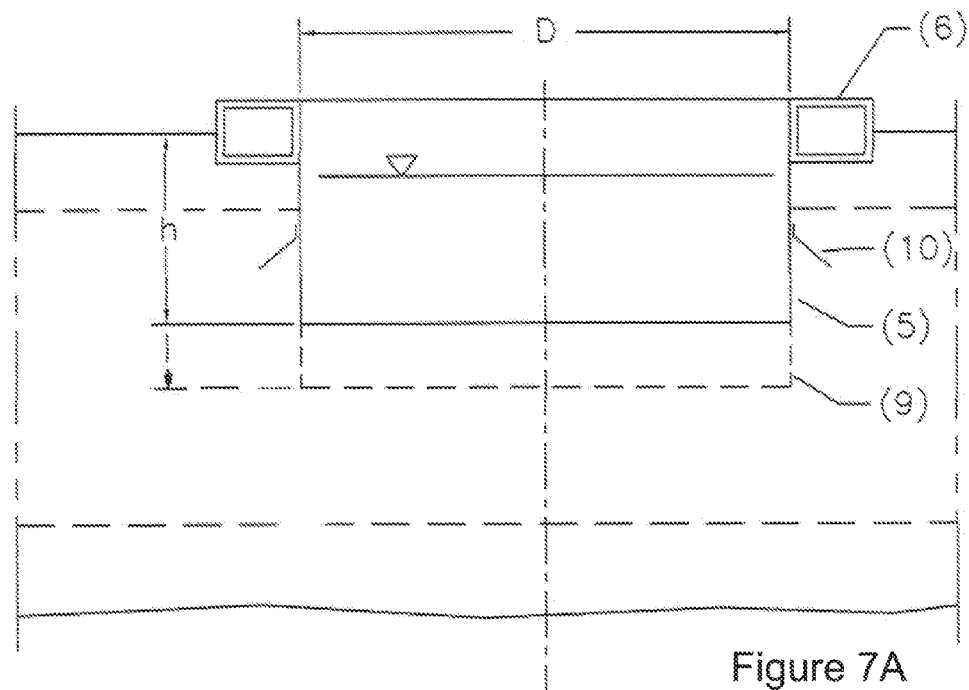
FIGS. 7A and 7B illustrate side and top views, respectively, of an embodiment of an MFT transfer system with adjustable side walls.
Figure 7B:
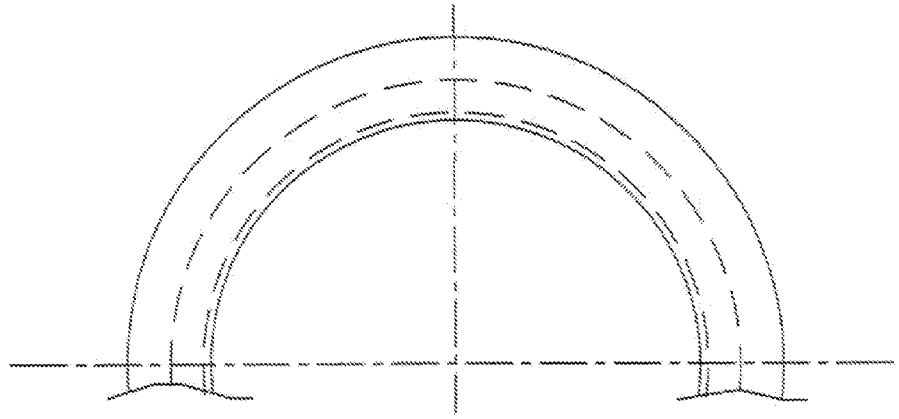

FIGS. 7A and 7B illustrate side and top views, respectively, of an embodiment of an MFT transfer system 5 with adjustable side walls. For example, the hollow conduit can be configured such that its outer wall can be adjusted, as indicated by reference numeral 9, to dynamically modify the dimension h. Thus, such an MFT transfer system 5 can be used to dynamically modify or adjust the properties (e.g., the density) of the MFT being removed from the pond. Further, the MFT transfer system 5 shown in FIG. 7 can include deflector plates 10, which can be coupled to and furnished around the outside of the hollow conduit 11 to mitigate water and lower density MFT migration down the outer surface of the hollow conduit 11. The deflector plates 10 can also be made of steel, aluminum, fiber reinforced polymer, or various other composites or polymers, such as HDPE.

Figure 8:
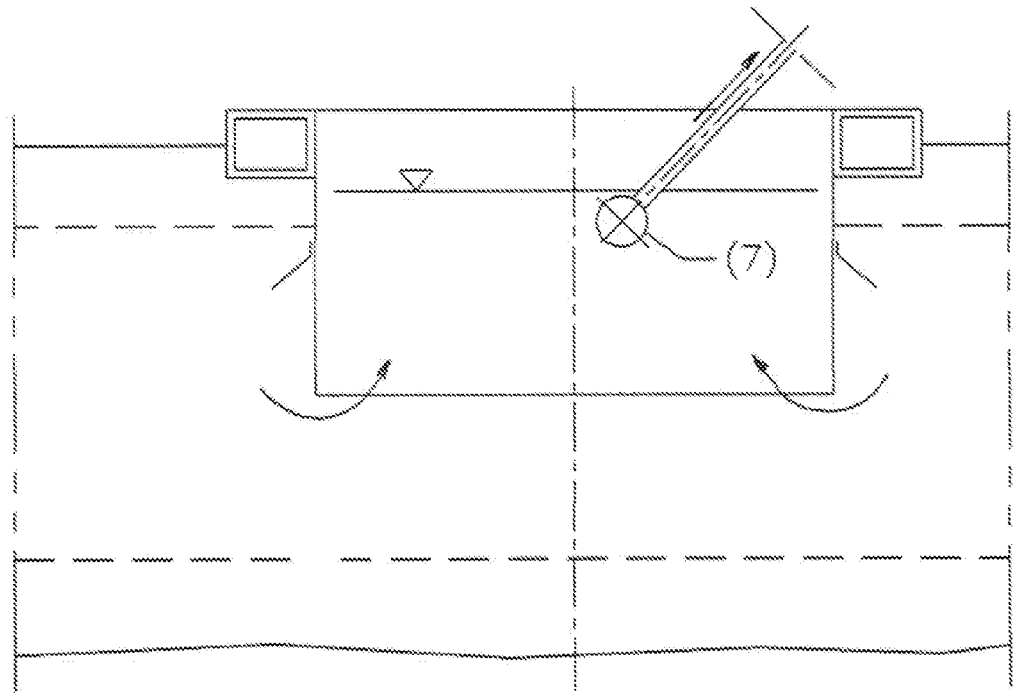
FIG. 8 illustrates an embodiment of an MFT transfer system including a pump.
Figure 9:
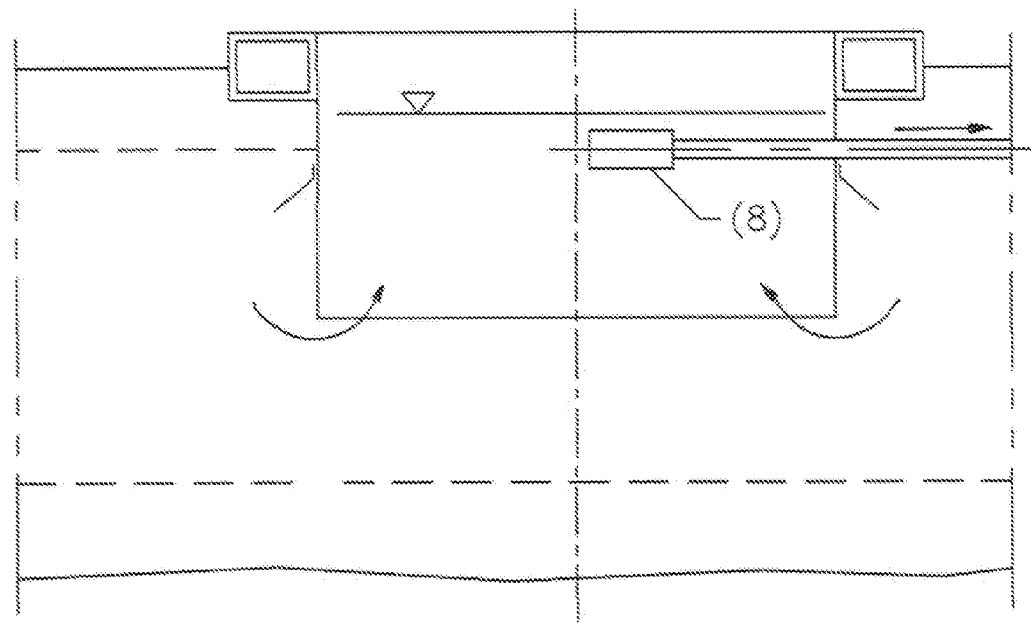
FIG. 9 illustrates an embodiment of an MFT transfer system including a siphon.

FIGS. 8 and 9 illustrate MFT transfer systems including different MFT transfer devices for carrying the MFT out of and away from the pond, such as for further processing. For example, FIG. 8 illustrates a pump 7 and FIG. 9 illustrates a siphon 8, each furnished within the confines of the hollow conduit 11 and provided for this purpose. The systems described herein can also include pipelines and other facilities for MFT delivery to a land based facility for further processing.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

I claim:

1. A method comprising:
    selecting a desired density of mature fine tailings to be removed from an oil sands tailings pond;
    positioning a hollow conduit within the oil sands tailings pond such that a bottom end of the hollow conduit is open to the mature fine tailings of the desired density and such that a top end of the hollow conduit is open above a free water surface of the pond; and
    removing the mature fine tailings of the desired density from within the hollow conduit.

2. The method of claim 1, further comprising adjusting a length of the hollow conduit.

3. The method of claim 1, further comprising coupling deflector plates to an outer surface of the hollow conduit.

4. The method of claim 1, further comprising coupling a buoyancy element to the hollow conduit.

5. The method of claim 1, wherein selecting a desired density comprises selecting a desired density greater than 1.35 t/m$^3$.

6. The method of claim 1, wherein the hollow conduit is a hollow cylindrical conduit.

7. The method of claim 1, wherein removing the mature fine tailings of the desired density from within the hollow conduit comprises pumping the mature fine tailings of the desired density from within the hollow conduit.

8. The method of claim 1, wherein removing the mature fine tailings of the desired density from within the hollow conduit comprises siphoning the mature fine tailings of the desired density from within the hollow conduit.

9. A method comprising:
    selecting a desired density of mature fine tailings to be removed from an oil sands tailings pond;
    selecting a desired recovery rate of the mature fine tailings of the desired density;
    selecting a fill level height of the mature fine tailings of the desired density to be maintained within a hollow conduit;
    determining a plastic viscosity of the mature fine tailings of the desired density;
    determining a shear strength at rest of the mature fine tailings of the desired density;
    determining a diameter of the hollow conduit so as to satisfy the condition that when the hollow conduit is positioned within the oil sands tailings pond such that a bottom end of the hollow conduit is open to the mature fine tailings of the desired density and such that a top end of the hollow conduit is open above a free water surface of the pond, and when the mature fine tailings of the desired density are being removed from within the hollow conduit:
    a net hydraulic head pressure acting upon the mature fine tailings of the desired density at an outer side of the bottom end of the hollow conduit balances a sum of a net hydraulic head pressure acting over the selected fill level height upon the mature fine tailings of the desired density at an inner side of the bottom end of the hollow conduit, a dynamic pressure of the mature fine tailings of the desired density, and an operating shear resistance of the mature fine tailings of the desired density; and
    fabricating the hollow conduit having the determined diameter.

10. The method of claim 9, further comprising positioning the hollow conduit within the oil sands tailings pond such that the bottom end of the hollow conduit is open to the mature fine tailings of the desired density and such that the top end of the hollow conduit is open above a free water surface of the pond.

11. The method of claim 10, further comprising removing the mature fine tailings of the desired density from within the hollow conduit.

12. The method of claim 11, wherein removing the mature fine tailings of the desired density from within the hollow conduit comprises pumping the mature fine tailings of the desired density from within the hollow conduit.

13. The method of claim 11, wherein removing the mature fine tailings of the desired density from within the hollow conduit comprises siphoning the mature fine tailings of the desired density from within the hollow conduit.

14. The method of claim 10, further comprising adjusting a length of the hollow conduit.

15. The method of claim 9, further comprising coupling deflector plates to an outer surface of the hollow conduit.

16. The method of claim 9, further comprising coupling a buoyancy element to the hollow conduit.

17. The method of claim 9, wherein selecting a desired density comprises selecting a desired density greater than 1.35 t/m$^3$.

18. The method of claim 9, wherein the hollow conduit is a hollow cylindrical conduit.

19. A system comprising:

an oil sands tailings pond including mature fine tailings; and a hollow conduit positioned within the pond such that a bottom end of the hollow conduit is open to the mature fine tailings, such that a top end of the hollow conduit is open above a free water surface of the pond, and such that the mature fine tailings fill the hollow conduit to a predetermined fill level height;

the hollow conduit having a diameter such that when the mature fine tailings are being removed from within the hollow conduit, a net hydraulic head pressure acting upon the mature fine tailings at an outer side of the bottom end of the hollow conduit balances a sum of a net hydraulic head pressure acting over the predetermined fill level height upon the mature fine tailings at an inner side of the bottom end of the hollow conduit, a dynamic pressure of the mature fine tailings, and an operating shear resistance of the mature fine tailings.

\* \* \* \* \*